(12) United States Patent
Thompson

(10) Patent No.: US 12,158,221 B1
(45) Date of Patent: Dec. 3, 2024

(54) MULTI-SEAT PLUG VALVE

(71) Applicant: Franklin Valve, LP, Houston, TX (US)

(72) Inventor: Dustin Ryan Thompson, Tomball, TX (US)

(73) Assignee: Franklin Valve, LP, Houston, TX (US)

( * ) Notice: Subject to any disclaimer, the term of this patent is extended or adjusted under 35 U.S.C. 154(b) by 0 days.

(21) Appl. No.: 18/702,257

(22) PCT Filed: Oct. 11, 2023

(86) PCT No.: PCT/US2023/076616
§ 371 (c)(1),
(2) Date: Apr. 17, 2024

(87) PCT Pub. No.: WO2024/077307
PCT Pub. Date: Apr. 11, 2024

Related U.S. Application Data

(60) Provisional application No. 63/511,944, filed on Jul. 5, 2023.

(51) Int. Cl.
*F16K 5/18* (2006.01)
*F16K 5/04* (2006.01)

(52) U.S. Cl.
CPC ............ *F16K 5/181* (2013.01); *F16K 5/0442* (2013.01); *F16K 5/0471* (2013.01)

(58) Field of Classification Search
CPC ....... F16K 5/181; F16K 5/0442; F16K 5/0471
USPC ................................................ 251/309–312
See application file for complete search history.

(56) References Cited

U.S. PATENT DOCUMENTS

| | | | |
|---|---|---|---|
| 3,425,661 A * | 2/1969 | Mayo | ........................ F16K 5/14 251/283 |
| 4,817,662 A * | 4/1989 | Skibowski | ............ F16K 5/0471 251/309 |
| 4,989,631 A | 2/1991 | Harbin | |
| 6,082,707 A | 7/2000 | Hosie et al. | |

(Continued)

FOREIGN PATENT DOCUMENTS

CN 109210228 A 1/2019

OTHER PUBLICATIONS

Kari Rodriquez, International Search report and Written Opinion for PCT Application No. PCT/US23/76616, Feb. 7, 2024, 8 pages, United States Patent and Trademark Office as the International Searching Authority, Alexandria, VA.

*Primary Examiner* — John Bastianelli
(74) *Attorney, Agent, or Firm* — William P. Jensen; Crain Caton & James, P.C.

(57) ABSTRACT

A multi-seat plug valve with a pair of sealing members separated by a rotatable plug, a body with one or more detents for receipt of a respective locking pin, a bonnet with one or more detents for receipt of a respective locking pin, linear track plates (upper/lower), and offset track plates (upper/lower). Each locking pin permanently rests in a respective slot in an upper or lower linear track plate. The locking pins may be moved between respective opposing detents in the upper or lower offset track plate and the bonnet or body, respectively, to affect i) radial movement of the sealing members when the linear track plates are coupled to the body and the bonnet by locking pins, and ii) rotational movement of the sealing members when the linear track plates are coupled to the upper and lower offset track plates by locking pins.

14 Claims, 10 Drawing Sheets

(56) References Cited

U.S. PATENT DOCUMENTS

| | | | |
|---|---|---|---|
| 6,598,853 B1 * | 7/2003 | Appleford | F16K 5/181 |
| | | | 251/192 |
| 6,834,675 B1 | 12/2004 | Gill | |
| 2020/0256149 A1 | 8/2020 | Witkowski et al. | |

* cited by examiner

MULTI-SEAT PLUG VALVE

RELATED APPLICATIONS

This application is a U.S. National Stage Application of PCT Application Serial No. PCT/US23/76616 filed on Oct. 11, 2023, which claims priority to U.S. Provisional Application No. 63/511,944, filed Jul. 5, 2023, which are each incorporated herein by reference.

FIELD OF THE DISCLOSURE

The following disclosure generally relates to a multi-seat plug valve and methods for using a multi-seat plug valve. More particularly, the multi-seat plug valve includes a pair of sealing members separated by a rotatable plug, a body with one or more detents for receipt of a respective locking pin, a bonnet with one or more detents for receipt of a respective locking pin, linear track plates (upper/lower), and offset track plates (upper/lower). Each locking pin permanently rests in a respective slot in an upper or lower linear track plate. The locking pins may be moved between respective opposing detents in the upper or lower offset track plate and the bonnet or body, respectively, to affect i) radial movement of the sealing members when the linear track plates are coupled to the body and the bonnet by locking pins, and ii) rotational movement of the sealing members when the linear track plates are coupled to the upper and lower offset track plates by locking pins.

BACKGROUND

Various types of valves may be used to control the flow of fluids through a pipeline. A double block and bleed (DBB) valve and a double isolation and bleed (DIB) valve are both designed with two sealing members to achieve an adequate seal against pressure from both ends of the valve in different fluid environments. One problem with achieving an adequate seal in any fluid environment is wear and tear on the seating surface of each sealing member due to friction from relative motion of the sealing members. This type of problem is common to gate valves and ball valves.

A gate valve typically includes a valve housing for the gate valve in a retracted (open) position and a fluid passageway for connection with a pipeline. As implied by the name, the valve operates like a gate by moving between an open position in the valve housing and a closed position in the fluid passageway. Once closed, the valve is substantially sealed and prevents or obstructs movement of the fluid through the fluid passageway. The ability to achieve an adequate seal is subject to various gate valve designs (DBB and DIB), which typically require radial movement of a pair of opposing sealing members (to seal/unseal the fluid passageway) and longitudinal movement of the sealing members (to clear/obstruct the fluid passageway).

Similarly, a ball valve (DBB or DIB) may utilize a pair of opposing sealing members that are capable of radial movement (to seal/unseal the fluid passageway) and rotational movement (to clear/obstruct the fluid passageway). Many ball valve designs, however, require complex mechanisms with threaded components and/or springs to impart radial and/or rotational movement of the sealing members. The use of threaded components and/or springs requires frequent maintenance or replacement due to wear and tear from the relative motion of the sealing members, which can significantly compromise the effectiveness of the ball valve.

BRIEF DESCRIPTION OF THE DRAWINGS

The present disclosure is described with reference to the accompanying drawings, in which like elements are referenced with like reference numbers, and in which.

DETAILED DESCRIPTION OF THE ILLUSTRATIVE EMBODIMENTS

Figure 1:
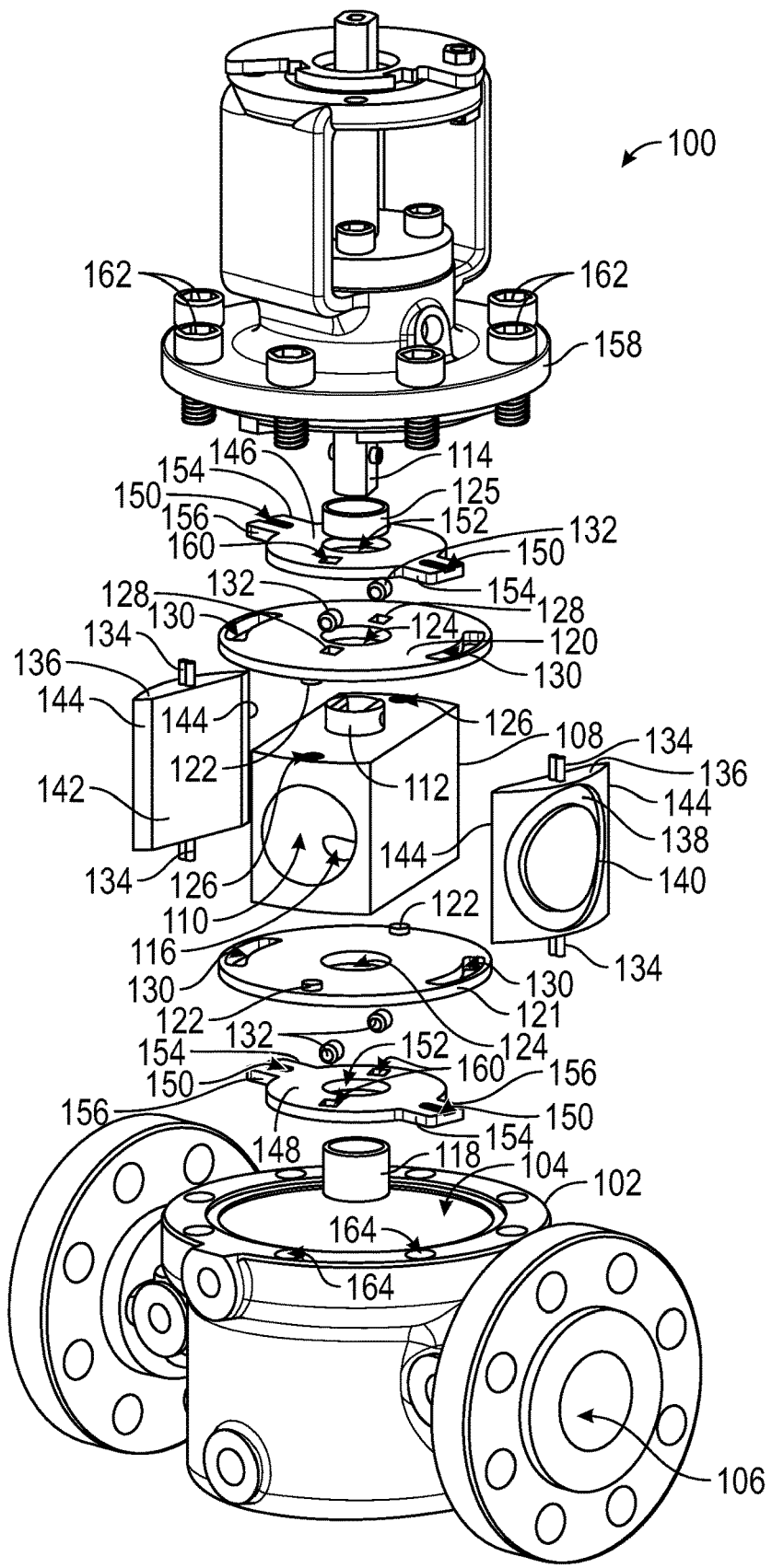
FIG. 1 is an exploded view of an exemplary embodiment of a multi-seat plug valve according to the present disclosure.

The subject matter disclosed herein is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will thus, be or become apparent to one of ordinary skill in the art upon examination of the following figures and detailed description. It is intended that all such features and advantages be included within the scope of the disclosed embodiments. Further, the illustrated figures are only exemplary and are not intended to assert or imply any limitation with regard to the environment, architecture, design, or process in which different embodiments may be implemented. The multi-seat plug valve embodiments disclosed herein thus, may be used to control the flow of fluids through different types of pipelines in different orientations. For convenience, a list of components identified by the figures is provided in Table 1 below.

TABLE 1

| No. | Description |
| --- | --- |
| 100 | Multi-Seat Plug Valve |
| 102 | Body |
| 104 | Chamber |
| 106 | Fluid Passage |
| 108 | Plug |
| 110 | Fluid Passage |
| 112 | Housing |
| 114 | Valve Stem |

TABLE 1-continued

| No. | Description |
| --- | --- |
| 116 | Opening |
| 118 | Bottom Bushing |
| 120 | First Offset Track Plate |
| 121 | Second Offset Track Plate |
| 122 | Pegs |
| 124 | Central Opening |
| 125 | Top Bushing |
| 126 | Recess |
| 128 | Detents |
| 130 | Offset Track Opening |
| 132 | Locking Pin |
| 134 | Pin |
| 136 | Sealing Member |
| 138 | Outer Face |
| 140 | Groove |
| 142 | Inner Face |
| 144 | Angled Side |
| 146 | First Linear Track Plate |
| 148 | Second Linear Track Plate |
| 150 | Linear Track Opening |
| 152 | Central Opening |
| 154 | First Travel Stop Shoulders |
| 156 | Second Travel Stop Shoulders |
| 158 | Bonnet |
| 160 | Locking Pin Opening |
| 162 | Threaded Bolt |
| 164 | Threaded Opening |
| 402 | Body Detent |
| 404 | Bonnet Detent |

The multi-seat plug valve and methods disclosed herein overcome the prior art disadvantages associated with conventional multi-seat valves (DBB and DIB) requiring complex mechanisms with threaded components and/or springs to impart radial and/or rotational movement of the sealing members. The multi-seat plug valve disclosed herein is simple, effective and durable because it includes a pair of sealing members that may be radially retracted/expanded and rotated open/closed with relatively few parts and no threaded components or springs. Because longitudinal movement of the sealing members is not required (as is with a gate valve), sealing may be achieved more quickly, the valve stem is less prone to wear/tear and foreign contaminants/debris are not as prone to interfere with the vale stem operation.

In one embodiment, the present disclosure includes a multi-seat plug valve, which comprises: i) a body with a chamber, a fluid passage and at least one detent for receipt of a locking pin; ii) a bonnet connected to the body, the bonnet including at least one detent for receipt of another locking pin; iii) a plug positioned within the body, the plug including a fluid passage, a first surface coupled to a valve stem and a second surface coupled to the body; iv) a first offset track plate coupled to the first surface of the plug, the first offset track plate including at least one detent on one side opposite a side coupled to the top surface of the plug for receipt of the another locking pin and a pair of offset track openings; v) a second offset track plate coupled to the second surface of the plug, the second offset track plate including at least one detent on one side opposite a side coupled to the second surface of the plug for temporary receipt of the locking pin and a pair of offset track openings; vi) a first linear track plate detachably coupled by the another locking pin to i) only the bonnet when the plug valve is at a fully closed position and ii) only the first offset track plate when the plug valve is at a fully open opposition, the first linear track plate including at least one opening for receipt of the another locking pin and a pair of linear track openings; vii) a second linear track plate detachably coupled by the locking pin to i) only the body when the plug valve is at the fully closed position and ii) only the second offset track plate when the plug valve is at the fully open position, the second linear track plate including at least one opening for receipt of the locking pin and a pair of linear track openings; and viii) a pair of sealing members, each sealing member coupled to the first offset track plate, the second offset track plate, the first linear track plate and the second linear track plate for i) radial movement of each sealing member when the first linear track plate and the second linear track plate are detachably coupled to only the bonnet and the body, respectively and ii) rotational movement of each sealing member when the first linear track plate and the second linear track plate are detachably coupled to only the first offset track plate and the second offset track plate, respectively.

In another embodiment, the present disclosure includes a method for operating a multi-seat plug valve, which comprises: i) radially adjusting a pair of sealing members within the plug valve, each sealing member coupled to a first offset track plate, a second offset track plate, a first linear track plate and a second linear track plate, the first linear track plate and the second linear track plate detachably coupled to only a plug valve bonnet or a plug valve body, respectively; and ii) rotating the pair of sealing members within the plug valve, the first linear track plate and the second linear track plate detachably coupled to only the first offset track plate and the second offset track plate, respectively.

Referring now to FIG. 1, an exploded view illustrates an exemplary embodiment of a multi-seat plug valve 100. The multi-seat plug valve 100 includes a body 102 with a chamber 104 and a fluid passage 106. The multi-seat plug valve 100 also includes a plug 108 positioned within the body 102. The plug 108 includes a fluid passage 110 that is substantially the same diameter as the diameter of the fluid passage 106. The plug 108 also includes a housing 112 on a top surface for receipt of a valve stem 114. The valve stem 114 is secured within the housing 112 by a coupling pin that passes through openings (not shown) in the housing 112 and the valve stem 114. The plug 108 includes an opening 116 through a bottom surface for receipt of a trunnion (not shown) extending upward from a center of an internal bottom surface of the body 102 and a bottom bushing 118. The valve stem 114 is used to rotate the plug 108 about the trunnion and the bottom bushing 118.

A first (upper) offset track plate 120 and a second (lower) offset track plate 121 each include a pair of pegs 122 on one side and a central opening 124 for receipt of the trunnion (not shown) and bottom bushing 118 or the housing 112 and a top bushing 125. Each pair of pegs 122 is equidistantly spaced from a respective opening 124 and, preferably, each peg 122 is positioned opposite another peg 122 relative to the respective opening 124. Each peg 122 fits within a respective recess 126 in the top surface or bottom surface of the plug 108 to prevent rotation of the first offset track plate 120 and the second offset track plate 121 relative to the plug 108. The first offset track plate 120 and second offset track plate 121 also include a respective pair of detents 128 on one side opposite the side that includes the pair of pegs 122 and a pair of offset track openings 130. Each pair of detents 128 is equidistantly spaced from a respective opening 124 and, preferably, each detent 128 is positioned opposite another detent 128 relative to the respective opening 124 but, alternatively, only a single detent 128 may be needed. Likewise, each pair of offset track openings 130 is equidistantly spaced from a respective opening 124 and, preferably, each offset track opening 130 is positioned opposite another offset track opening 130 relative to the respective opening 124. Each detent 128 is designed for temporary receipt of a respective cylindrical locking pin 132. Each offset track opening 130 is designed for receipt of a respective upper or lower pin 134 extending from an upper or lower end of a respective sealing member 136. Each offset track opening 130 is arcuate with one or more offset radius profiles and includes two sides that are in permanent communication with the respective upper of lower pin 134 and two ends that are in temporary communication with the respective upper or lower pin 134. Each detent 128 is, preferably, positioned equidistantly between one end of each offset track opening 130.

Each sealing member 136 includes a cylindrical outer face 138 with a circular groove 140 for receipt of a seal (not shown) made of an incompressible material and/or a compressible material such as an elastomer. Each sealing member 136 also includes a substantially planar inner face 142 with angled sides 144.

A first (upper) linear track plate 146 and a second (lower) linear track plate 148 each include a pair of linear track openings 150 and a central opening 152 for receipt of the trunnion (not shown) and bottom bushing 118 or the housing 112 and the top bushing 125. Each pair of linear track openings 150 is equidistantly spaced from a respective opening 152 and, preferably, each linear track opening 150 is positioned opposite another linear track opening 150 relative to the respective opening 152. Each linear track opening 150 is designed for receipt of a respective upper or lower pin 134 extending from an upper or lower end of a respective sealing member 136. Each linear track opening 150 is linear and includes two sides that are in permanent communication with the respective upper of lower pin 134 and two ends that are in temporary communication with the respective upper or lower pin 134 and may be flat or radiused. The first linear track plate 146 and the second linear track plate 148 also include a respective pair of first travel stop shoulders 154 for temporary abutting engagement with a respective pair of first travel stops on the body 102 or a bonnet 158 and a respective pair of second travel stop shoulders 156 for temporary abutting engagement with a respective pair of second travel stops on the body 102 or the bonnet 158. The first linear track plate 146 and the second linear track plate 148 further include a respective pair locking pin openings 160 equidistantly spaced from a respective opening 152 and, preferably, each locking pin opening 160 is positioned opposite another locking pin opening 160 relative to the respective opening 152 but, alternatively, only a single locking pin opening 160 may be needed. Each locking pin opening 160 is designed for permanent receipt of a respective cylindrical locking pin 132. Each locking pin opening 160 is positioned between a respective pair of linear track openings 150.

The bonnet 158 is fastened to the body 102 by a plurality of threaded bolts 162 wherein each bolt 162 is received within a respective threaded opening 164 in the body 102. The fully assembled multi-seat plug valve 100 thus, includes a pair of sealing members 136 that may be radially retracted/ expanded relative to a co-radial inner diameter surface of the body 102 and rotated open/closed as further described in reference to FIGS. 2-10. In yet other embodiments, other objects with different geometric shapes and sizes than the locking pins and travel stops described herein may be used for the same purpose. Similarly, other geometric shapes and sizes than the detents and locking pin openings described herein may be used for the same purpose when other objects with different geometric shapes and sizes are used in place of the locking pins.

Figure 2:
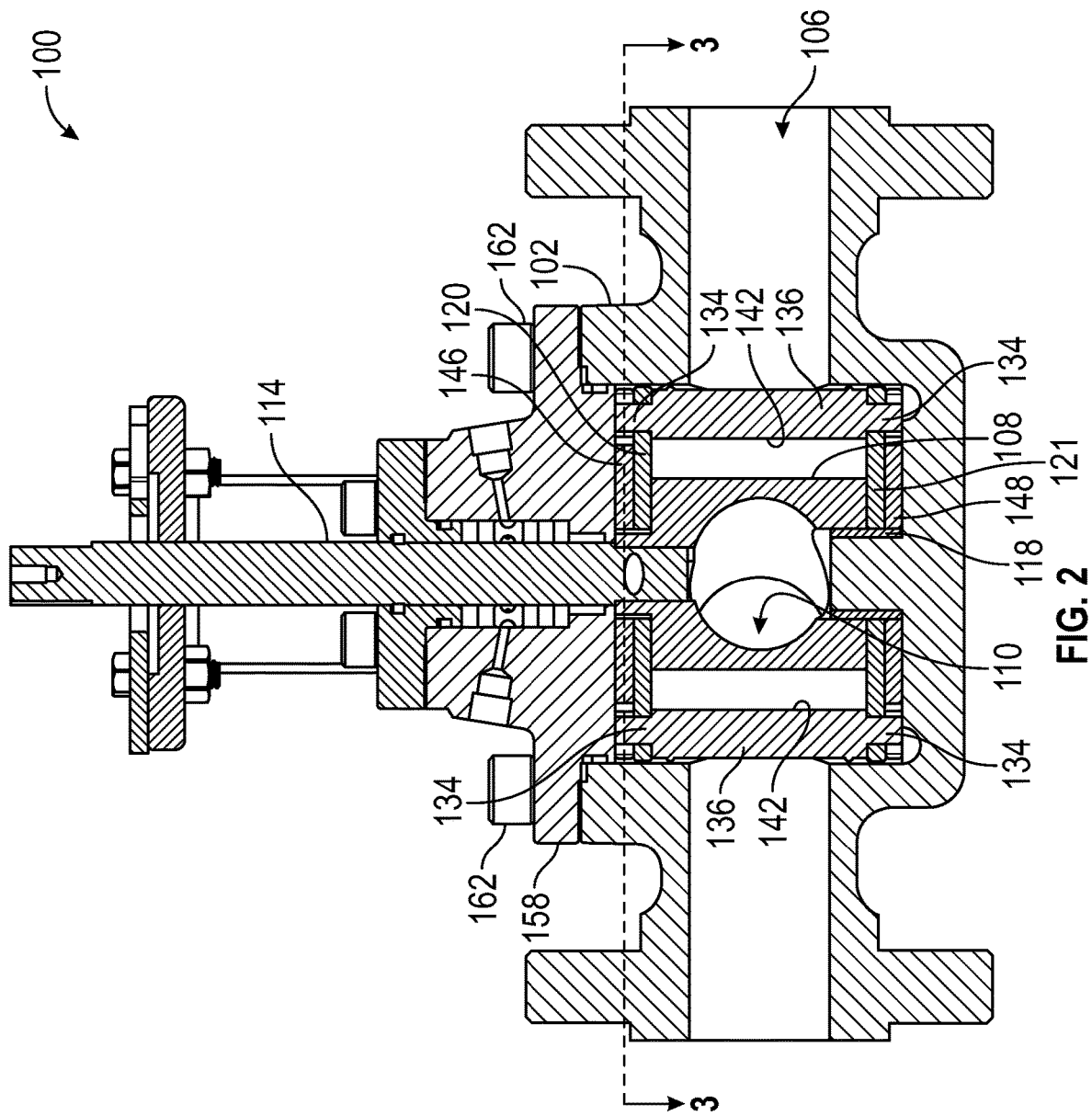
FIG. 2 is a cross-sectional view of the multi-seat plug valve in FIG. 1 at a fully retracted position.
Figure 3:
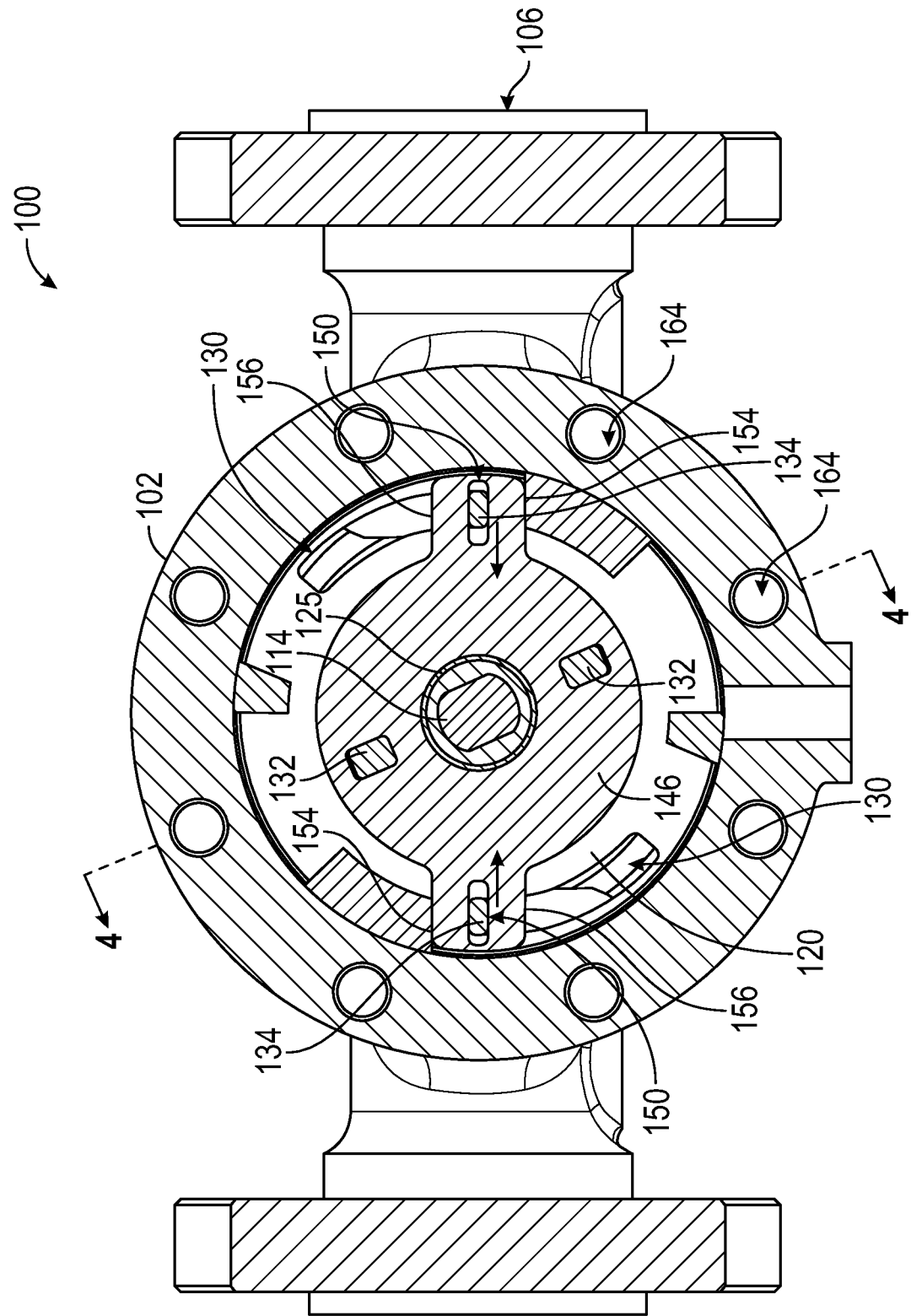
FIG. 3 is a cross-sectional view of the multi-seat plug valve in FIG. 2 along 3-3.
Figure 4:
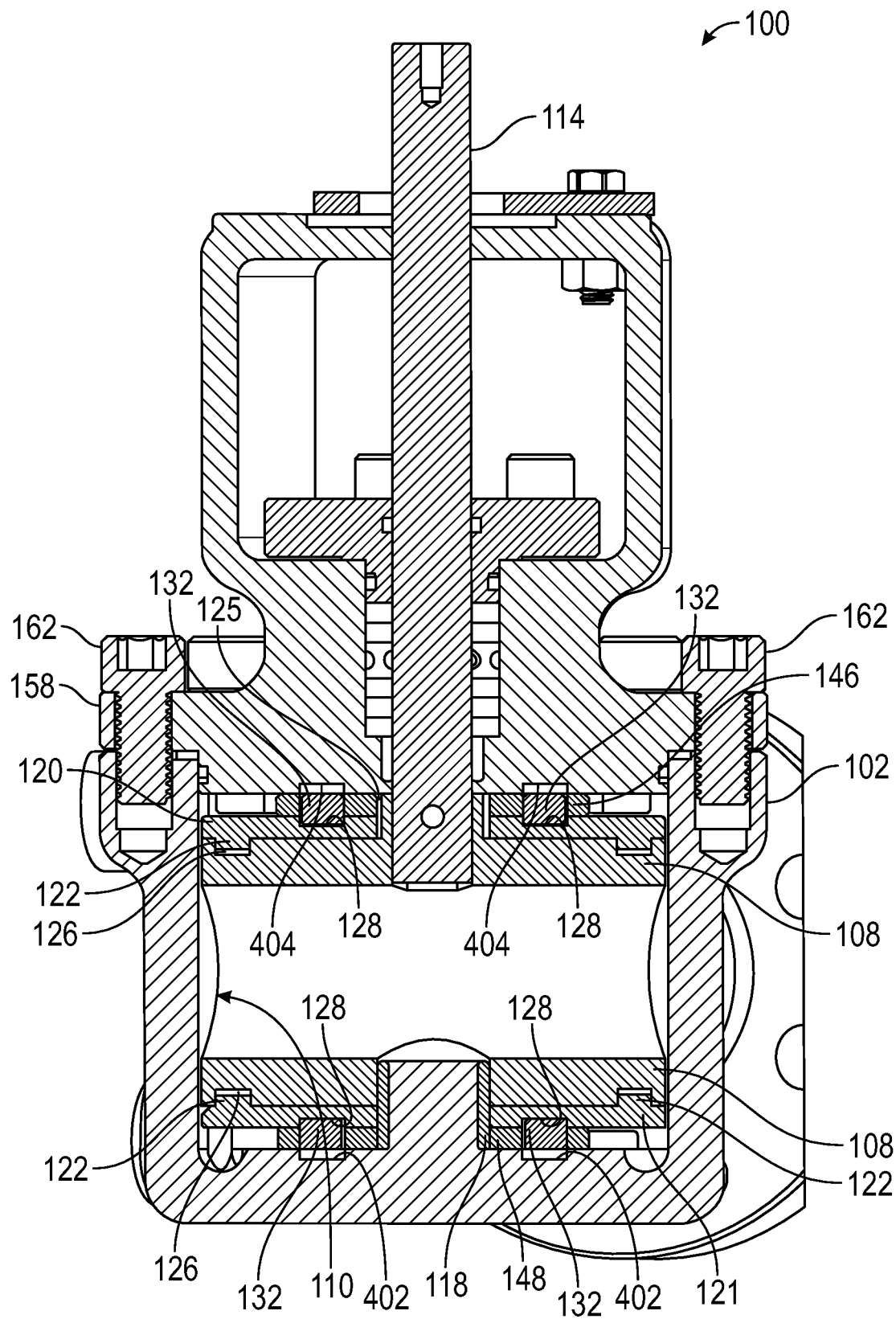
FIG. 4 is a cross-sectional view of the multi-seat plug valve in FIG. 3 along 4-4.
Figure 8:
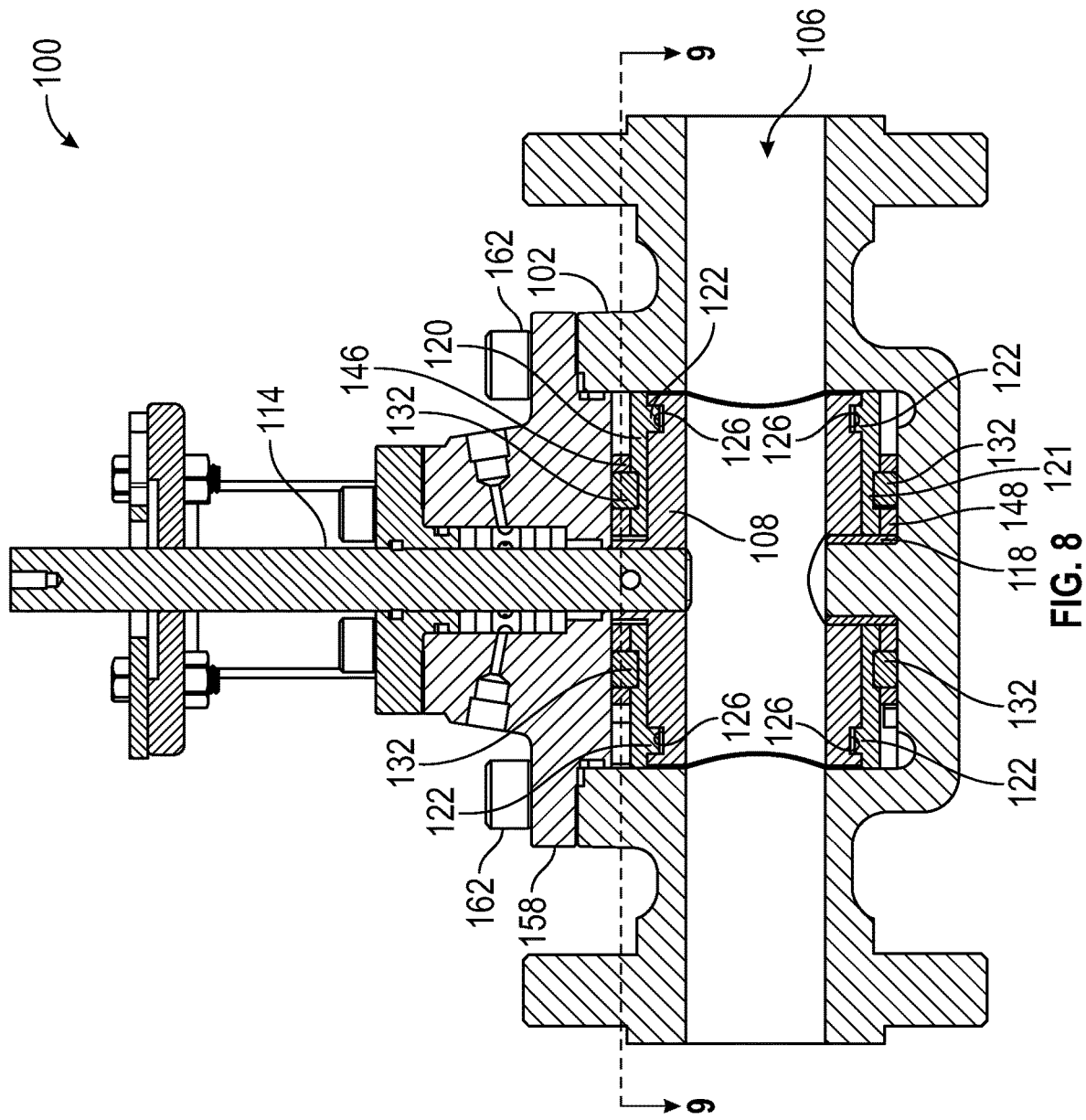
FIG. 8 is a cross-sectional view of the multi-seat plug valve in FIG. 1 at a fully open position.
Figure 9:
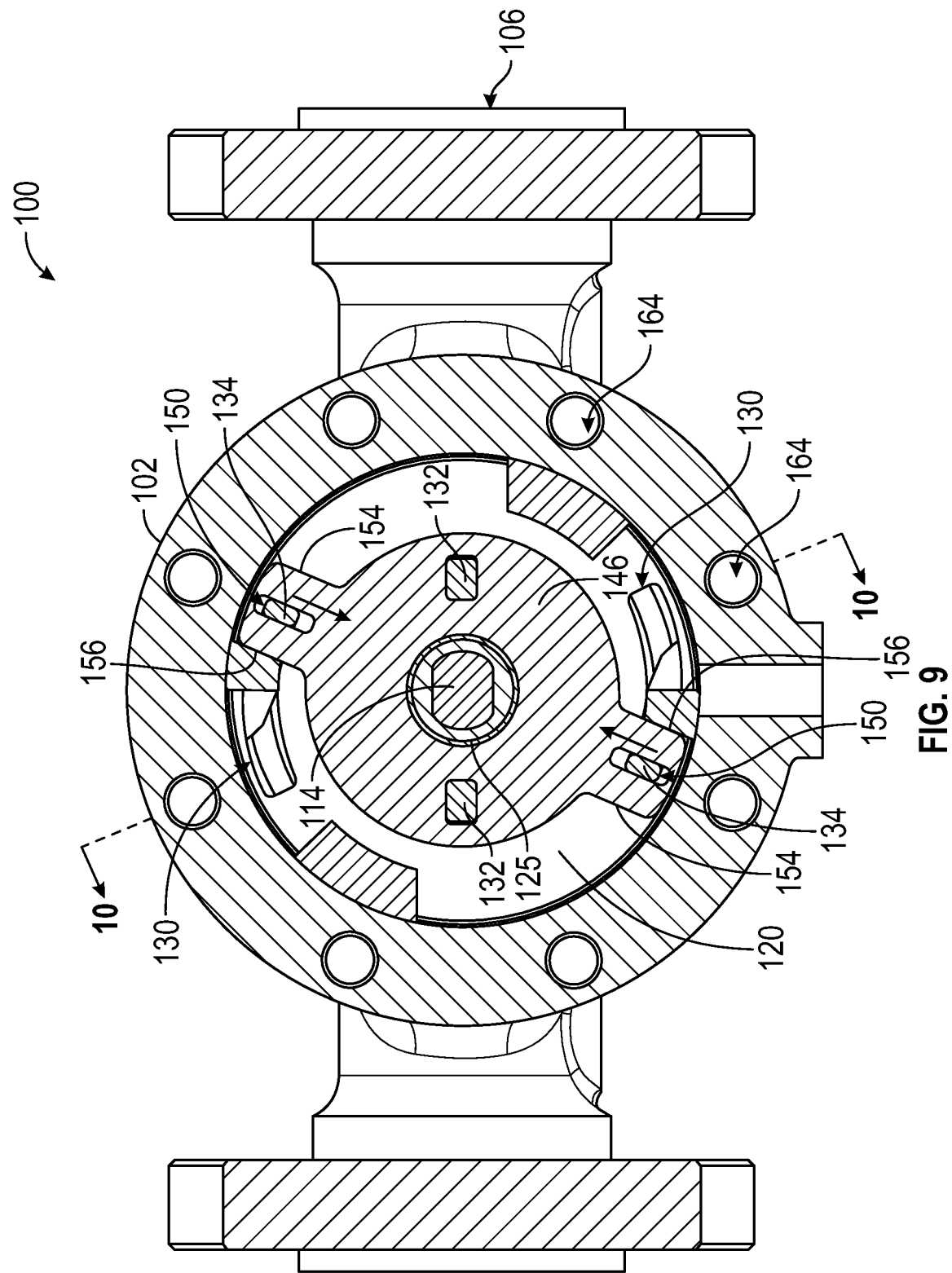
FIG. 9 is a cross-sectional view of the multi-seat plug valve in FIG. 8 along 9-9.
Figure 10:
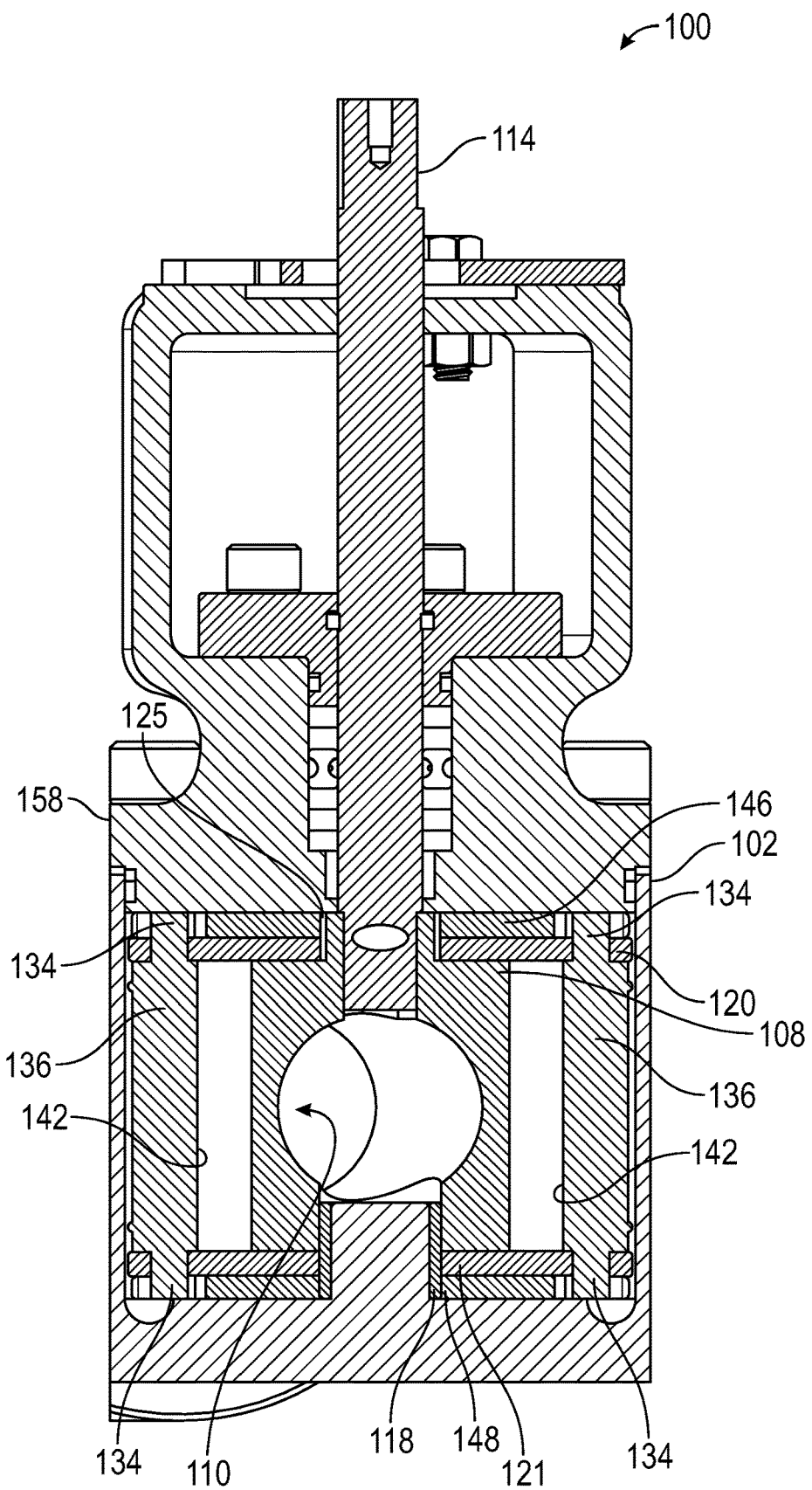
FIG. 10 is a cross-sectional view of the multi-seat plug valve in FIG. 9 along 10-10.

Referring now to FIGS. 2-4, three different cross-sectional views illustrate the multi-seat plug valve 100 in FIG. 1 at a fully retracted position. This position may be achieved from a fully sealed (seated) position (FIGS. 5-7) or a fully open position (FIGS. 8-10).

From a fully sealed position, the multi-seat plug valve 100 can be rotated to a fully retracted position by rotating the valve stem 114 counterclockwise. As the valve stem 114 rotates, so do the plug 108, the first offset track plate 120 and the second offset track plate 121. As the first offset track plate 120 and the second offset track plate 121 rotate counterclockwise, each offset track opening 130 exerts a force on a respective pin 134 causing the respective pin 134 to want to move with the interfacing surfaces of the offset track opening 130. Due to the design of each offset track opening 130 and each linear track opening 150, the first liner track plate 146 and the second linear track plate 148 exert a reaction force on each pin 134 that negates all component force vectors except for those in a radial direction causing each pin 134 to traverse the offset track opening 130 from a first end at the fully sealed position to a second end at the fully retracted position while being forced radially inward. This reaction causes each sealing member 136 to move from a fully sealed position to a fully retracted position. The first liner track plate 146 and the second linear track plate 148 resist rotation and thus, are held in place until each sealing member 136 reaches a fully retracted position (about 49 degrees of travel) by the locking relationship between each locking pin 132 permanently positioned within a respective locking pin opening 160 and temporarily positioned within a respective body detent 402 or bonnet detent 404. Once each sealing member 136 reaches a fully retracted position, each detent in the first offset track plate 120 and the second offset track plate 121 is aligned with a respective locking pin 132 and a respective body detent 402 or a respective bonnet detent 404. As each locking pin 132 travels within a respective locking pin opening 160, it will interface with a radiused surface of a respective body detent 402 or a respective bonnet detent 404 that, being static, apply a reactionary force on a respective locking pin 132 forcing each locking pin 132 out of a respective body detent 402 or a respective bonnet detent 404 and into a respective detent 128 in the first offset track plate 120 or the second offset track plate 121. At this fully retracted position, the first offset track plate 120 and the second offset track plate 121 are secured to the first liner track plate 146 and the second linear track plate 148, respectively, by each locking pin 132. Further, each pin 134 is positioned within a respective linear track opening 150 at one end closest to the central opening 152 and plug 108 engages one angled side 144 of each sealing member 136.

From the fully retracted position, the multi-seat plug valve 100 can be rotated to a fully open position (FIGS. 8-10) by continued counterclockwise rotation of the valve stem 114. As the valve stem 114 rotates, so do the plug 108, the first offset track plate 120, the second offset track plate 121, the first liner track plate 146 and the second linear track plate 148. Because the plug 108 engages one angled side 144 of each sealing member 136 and each pin 134 engages a second end of a respective offset track opening 130 at the fully retracted position, each sealing member is rotated with counterclockwise rotation of the plug 108 (about 67 degrees of travel) until the fluid passage 106 in the body 102 is aligned with the fluid passage 110 in the plug 108. Each second travel stop shoulder 156 temporarily engages a respective second travel stop on the body 102 or the bonnet 158, which stops rotation at the fully open position.

Figure 5:
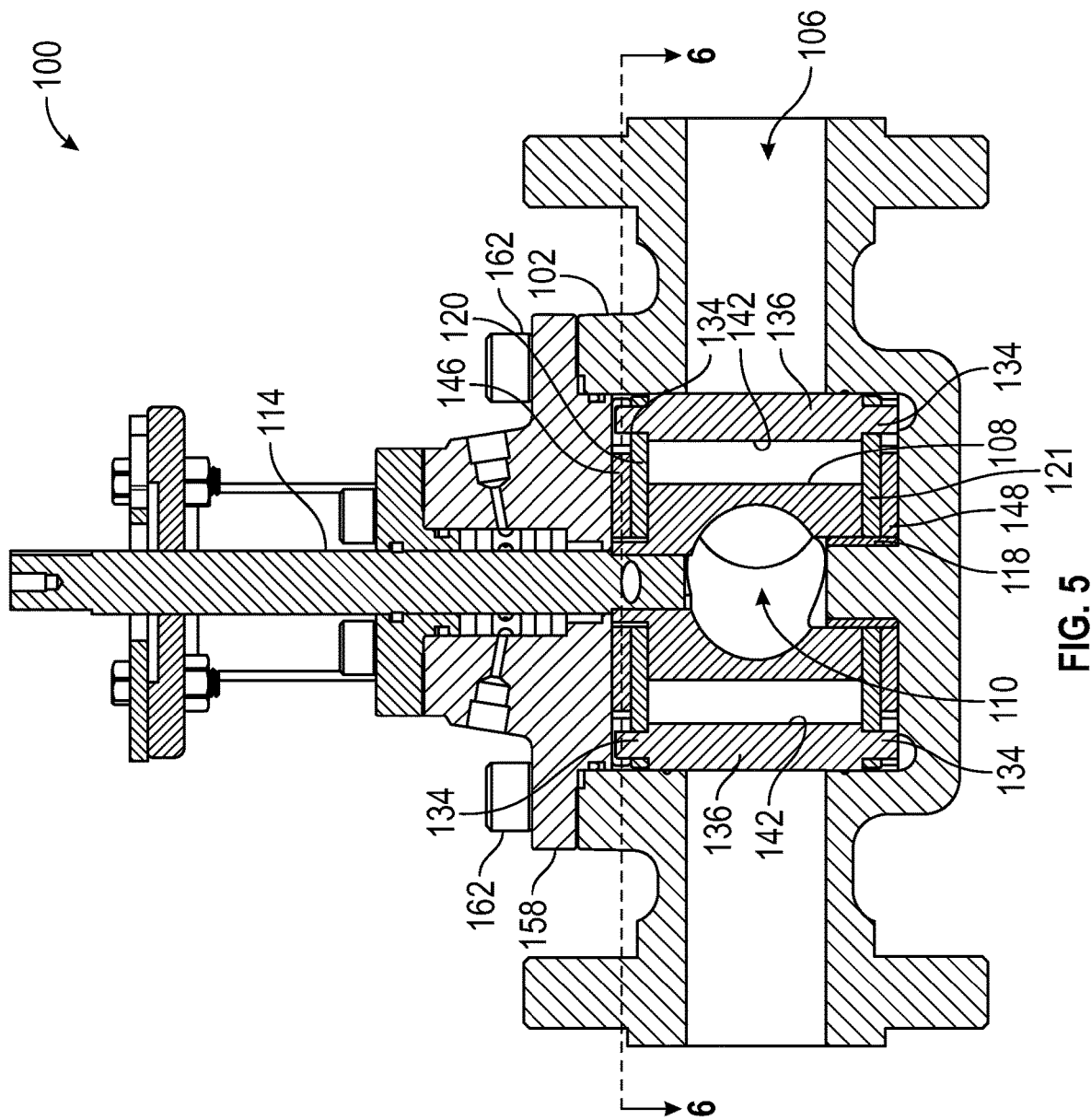
FIG. 5 is a cross-sectional view of the multi-seat plug valve in FIG. 1 at a fully sealed position.
Figure 6:
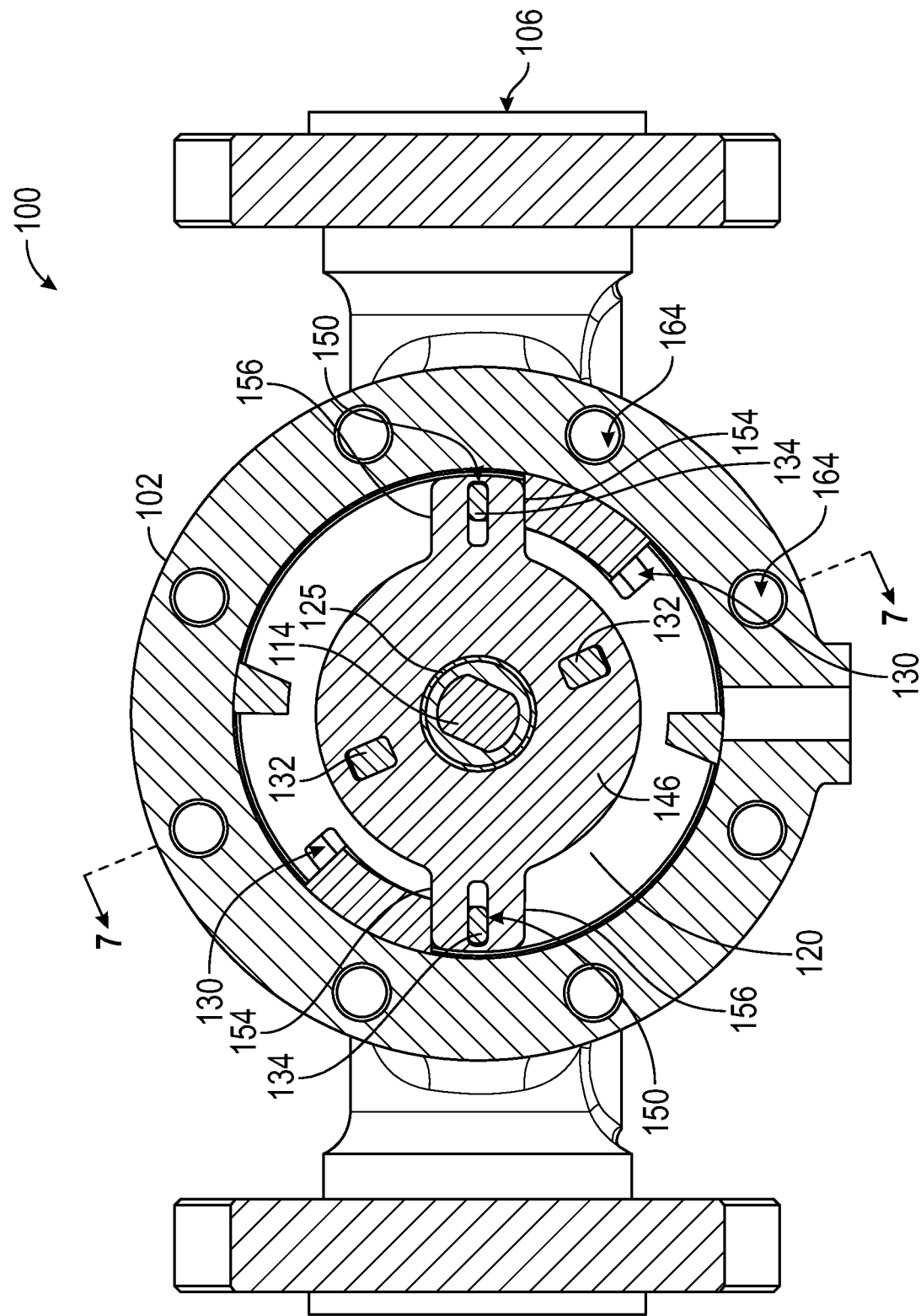
FIG. 6 is a cross-sectional view of the multi-seat plug valve in FIG. 5 along 6-6.
Figure 7:
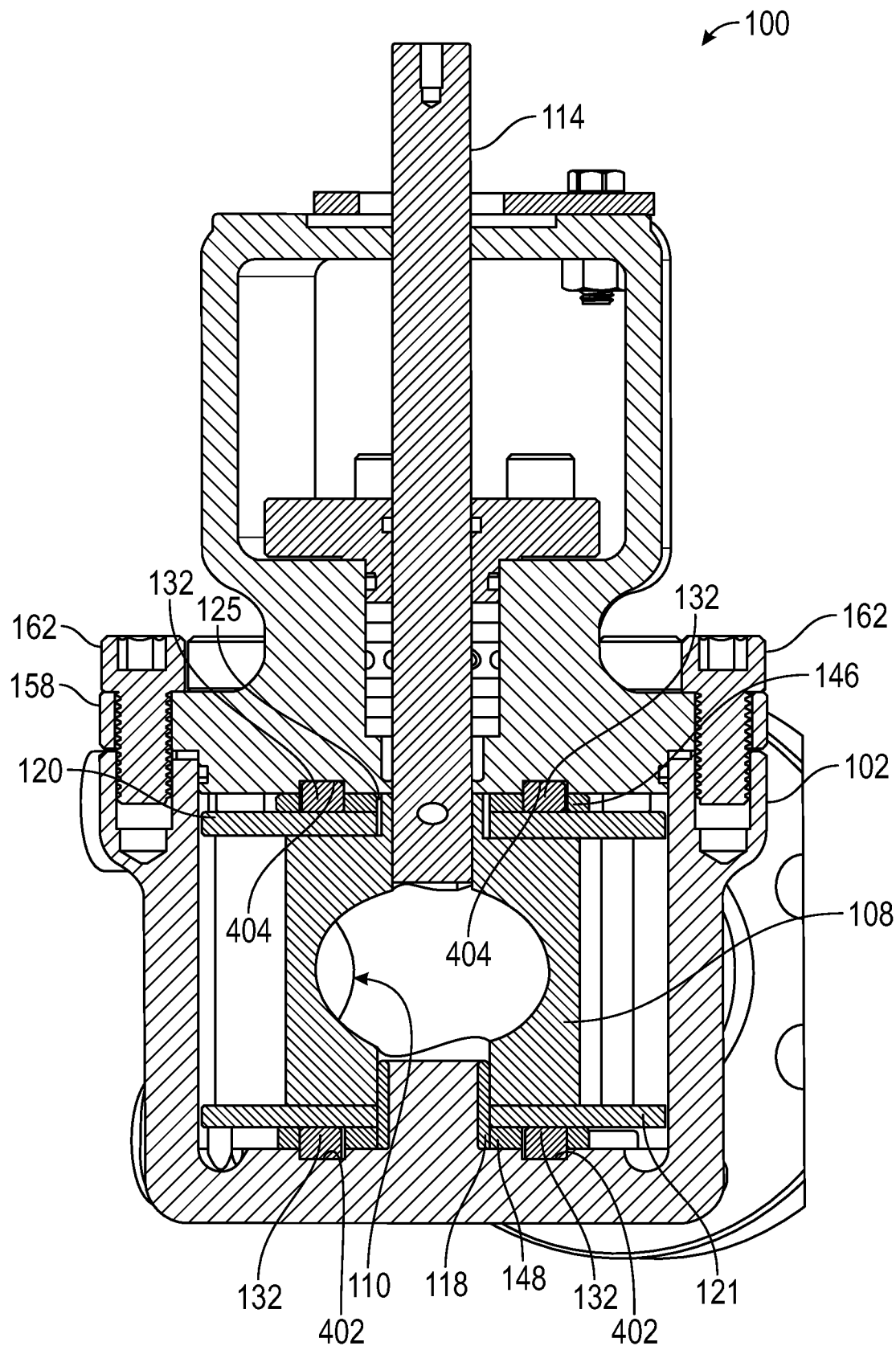
FIG. 7 is a cross-sectional view of the multi-seat plug valve in FIG. 6 along 7-7.

Referring now to FIGS. 5-7, three different cross-sectional views illustrate the multi-seat plug valve 100 in FIG. 1 at a fully sealed (seated) position. In this position, the plug 108, the valve stem 114, the first offset track plate 120, the second offset track plate 121, the first linear track plate 146, the second linear track plate 148 and the sealing members 136 are at the extreme clockwise position of their respective rotational travel. The seal (not shown) within the circular groove 140 of each sealing member 136 is expanded radially outward into sealing engagement with a respective co-radial inner diameter surface of the body 102. Each pin 134 is positioned within an offset track opening 130 at the first end (fully sealed position) and is positioned within a linear track opening 150 at another end farthest from the central opening 152. The first linear track plate 146 and the second linear track plate 148 are temporarily coupled with the bonnet 158 and the body 102, respectively, by each locking pin 132 permanently positioned within a respective locking pin opening 160 and temporarily positioned within a respective body detent 402 or bonnet detent 404. Each first travel stop shoulder 154 temporarily engages a respective first travel stop on the body 102 or the bonnet 158, which stops rotation at the fully sealed position. In this manner, a longitudinal axis of each linear track opening 150 is aligned with a longitudinal axis of the fluid passage 106 of the body 102.

Referring now to FIGS. 8-10, three different cross-sectional views illustrate the multi-seat plug valve 100 in FIG. 1 at a fully open position. In this position, the plug 108, the valve stem 114, the first offset track plate 120, the second offset track plate 121, the first linear track plate 146, the second linear track plate 148 and the sealing members 136 are at the extreme counterclockwise position of their respective rotational travel. Each sealing member 136 is radially retracted out of sealing engagement with a respective co-radial inner diameter surface of the body 102 and is rotated away from the fluid passage 106 leaving the same unobstructed. Each pin 134 is positioned within an offset track opening 130 at the second end (fully open position) and is positioned within a linear track opening 150 at the end closest to the central opening 152. The first linear track plate 146 and the second linear track plate 148 are temporarily coupled with the first offset track plate 120 and the second offset track plate 121, respectively, by each locking pin 132 permanently positioned within a respective locking pin opening 160 and temporarily positioned within a respective detent 128. Each second travel stop shoulder 156 temporarily engages a respective second travel stop on the body 102 or the bonnet 158, which stops rotation at the fully open position.

From the fully open position, the multi-seat plug valve 100 can be rotated back to the fully retracted position (FIGS. 2-4) by continued clockwise rotation of the valve stem 114. As the valve stem 114 rotates, so do the plug 108, the first offset track plate 120, the second offset track plate 121, the first liner track plate 146, the second linear track plate 148 and the sealing members 136 until each first travel stop shoulder 154, the first linear track plate 146 and the second linear track plate 148, temporarily engage a respective first travel stop on the body 102 or the bonnet 158, which stops rotation of the first linear track plate 146, and the second linear track plate 148. Simultaneously, each locking pin opening 160 is aligned with a respective body detent 402 or bonnet detent 404. As each locking pin 132 travels within a respective locking pin opening 160, it will interface with a radiused surface of the respective offset track plate detents 128 that, being dynamic, apply a expulsionary force on a respective locking pin 132 forcing each locking pin 132 out of a respective offset track plate detent 128 and into a respective body detent 402 or respective bonnet detent 404. At this fully retracted position, with continued clockwise rotation of the valve stem 114 going toward the fully seated position, the first offset track plate 120 and the second offset track plate 121 are unlocked from the first liner track plate 146 and the second linear track plate 148, respectively, and are allowed to continue rotating freely, thus creating the dynamics necessary for the expansion of the sealing members 136 into the fully seated position.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for operating a multi-seat plug valve, which comprises:
    radially adjusting a pair of sealing members within the plug valve, each sealing member coupled to a first offset track plate, a second offset track plate, a first linear track plate and a second linear track plate, the first linear track plate and the second linear track plate detachably coupled to only a plug valve bonnet or a plug valve body, respectively; and
    rotating the pair of sealing members within the plug valve, the first linear track plate and the second linear track plate detachably coupled to only the first offset track plate and the second offset track plate, respectively.

2. The method of claim 1, further comprising rotating a plug within the plug valve to enable radial adjustment and rotation of the pair of sealing members, the plug coupled to the first offset track plate and the second offset track plate.

3. A multi-seat plug valve, which comprises:
    a body with a chamber, a fluid passage and at least one detent for receipt of a locking pin;
    a bonnet connected to the body, the bonnet including at least one detent for receipt of another locking pin;
    a plug positioned within the body, the plug including a fluid passage, a first surface coupled to a valve stem and a second surface coupled to the body;
    a first offset track plate coupled to the first surface of the plug, the first offset track plate including at least one detent on one side opposite a side coupled to the top surface of the plug for receipt of the another locking pin and a pair of offset track openings;
    a second offset track plate coupled to the second surface of the plug, the second offset track plate including at least one detent on one side opposite a side coupled to the second surface of the plug for temporary receipt of the locking pin and a pair of offset track openings;
    a first linear track plate detachably coupled by the another locking pin to i) only the bonnet when the plug valve is at a fully closed position and ii) only the first offset track plate when the plug valve is at a fully open opposition, the first linear track plate including at least one opening for receipt of the another locking pin and a pair of linear track openings;
    a second linear track plate detachably coupled by the locking pin to i) only the body when the plug valve is at the fully closed position and ii) only the second offset track plate when the plug valve is at the fully open position, the second linear track plate including at least one opening for receipt of the locking pin and a pair of linear track openings; and a pair of sealing members, each sealing member coupled to the first offset track plate, the second offset track plate, the first linear track plate and the second linear track plate for i) radial movement of each sealing member when the first linear track plate and the second linear track plate are detachably coupled to only the bonnet and the body, respectively and ii) rotational movement of each sealing member when the first linear track plate and the second linear track plate are detachably coupled to only the first offset track plate and the second offset track plate, respectively.

4. The multi-seat plug valve of claim 3, wherein each pair of offset track openings is equidistantly spaced from a central opening of the respective first offset track plate and the second offset track plate.

5. The multi-seat plug valve of claim 3, wherein each offset track opening is arcuate with one or more offset radius profiles.

6. The multi-seat plug valve of claim 5, wherein each offset track opening includes two sides in permanent communication with an upper pin or a lower pin extruding from an upper end or a lower end, respectively, of a respective one of the pair of sealing members and two ends in temporary communication with the upper pin or the lower pin.

7. The multi-seat plug valve of claim 3, wherein each sealing member includes a cylindrical outer face with a circular groove for receipt of a seal.

8. The multi-seat plug valve of claim 3, wherein each pair of linear track openings is equidistantly spaced from a central opening of the respective first linear track plate and the second linear track plate.

9. The multi-seat plug valve of claim 3, wherein each linear track opening is linear.

10. The multi-seat plug valve of claim 9, wherein each linear track opening includes two sides in permanent communication with an upper pin or a lower pin extending from an upper end or a lower end, respectively, of a respective one of the pair of sealing members and two ends in temporary communication with the upper pin or the lower pin.

11. The multi-seat plug valve of claim 3, wherein the first linear track plate and the second linear track plate include a respective pair of first travel stop shoulders for temporary abutting engagement with a respective pair of first travel stops on the body or the bonnet.

12. The multi-seat plug valve of claim 11, wherein the first linear track plate and the second linear track plate include a respective pair of second travel stop shoulders for temporary abutting engagement with a respective pair of second travel stops on the body or the bonnet.

13. The multi-seat plug valve of claim 3, wherein the locking pin and the another locking pin are cylindrical.

14. The multi-seat plug valve of claim 3, wherein the locking pin and the another locking pin are spherical.

* * * * *